Oct. 26, 1948.　　　W. P. COUSINO　　　2,452,292
PRESSURE INTENSIFIER
Filed Aug. 25, 1944
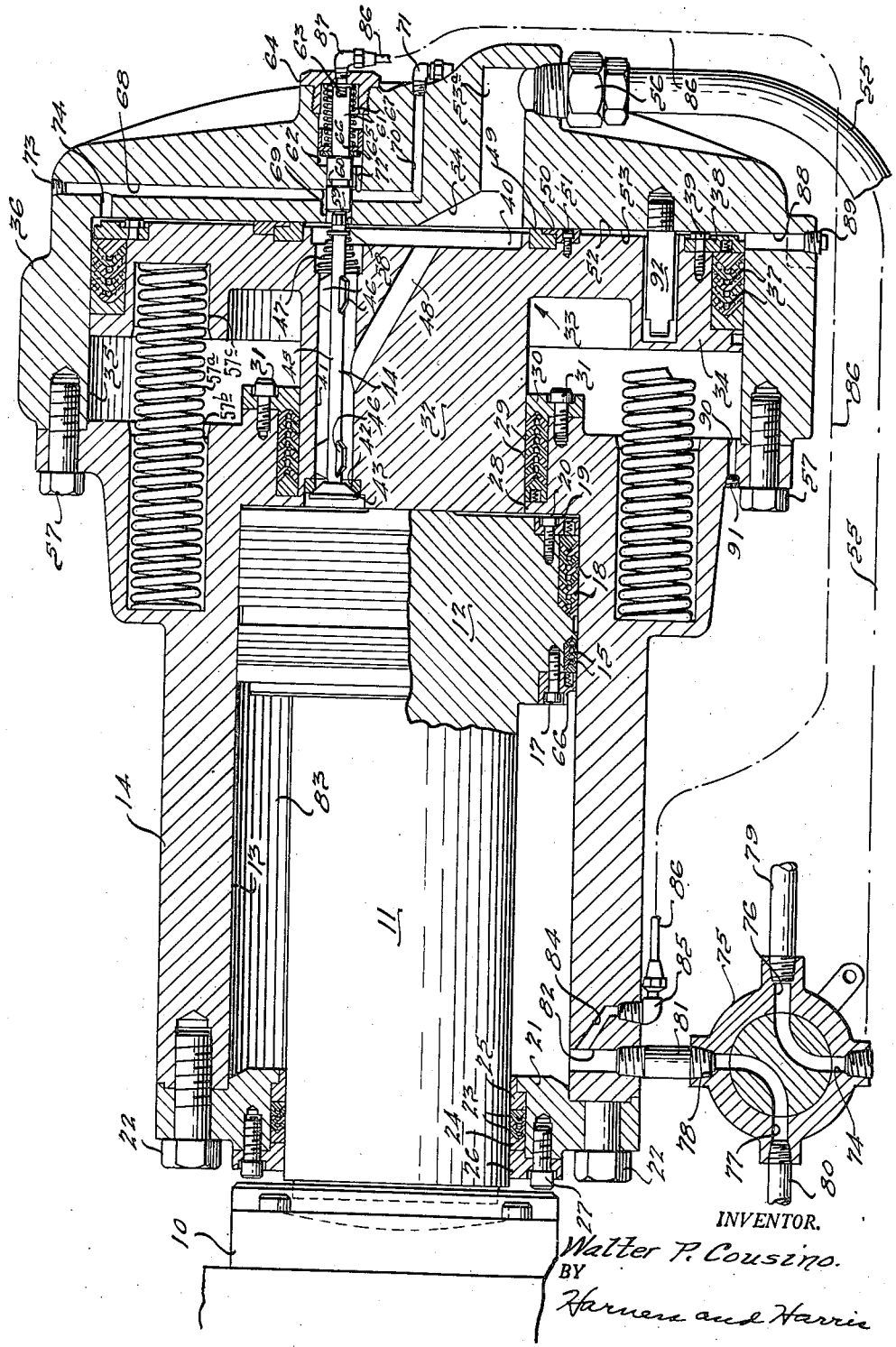
INVENTOR.
Walter P. Cousino.
BY
Harness and Harris
ATTORNEYS.

Patented Oct. 26, 1948

2,452,292

UNITED STATES PATENT OFFICE 2,452,292

PRESSURE INTENSIFIER

Walter P. Cousino, Detroit, Mich., assignor to Chrysler Corporation, Highland Park, Mich., a corporation of Delaware Application August 25, 1944, Serial No. 551,191

10 Claims. (Cl. 60—54.5)

This invention relates to a fluid-pressure means for applying force. More specifically it relates to the use of fluid-pressure means for applying force to a part to move the part into a certain position and for holding the part there. The invention is applied advantageously to the holding of mold parts adapted to receive thermo-plastic or thermo-setting materials. The invention may also be applied to moving a part with a relatively small force and then moving it with a relatively great force as well as to merely applying first a relatively small force and then a relatively large force.

A mold for materials setting under changes in temperature and/or pressure normally comprises mating parts, one stationary, the other movable. The movable part is brought into engagement with the stationary part, is held in such engagement during injection of the aforementioned materials and setting thereof, and is moved away from the stationary part for removal of the set mass from the mold. When such materials are injected into a mold under a high pressure, there is a high pressure set up tending to force the movable mold part away from the stationary part. Thus the apparatus controlling the movable mold part should be capable of moving the movable part into place, holding the movable part in place with great force, and moving away the movable part. The present invention relates to an apparatus for doing these things, and, although the apparatus illustrated is very advantageously employed with a mold for materials of the above type injected under pressure and is of special advantage with this type of mold, it is to be understood that it may be applied to other types of molds and also to any arrangement in which a movable part is shifted into a certain position and is held in such position. The apparatus may also be employed in the application of force in large and small quantities.

An object of the present invention is to provide means for shifting a part to a certain position and holding it with force in that position. These parts may advantageously be parts of a mold for thermo-plastic or thermo-setting materials, for the requirements of such a mold are that the parts thereof be brought together and then held with great force during the injection of material into the mold.

Another object is to provide means for applying a certain intermediate total force and then a greatly increased total force without greatly increasing the pressure. Such means can be employed to good advantage in the control of parts of an injection mold.

A further object is the use of pistons for applying force by means of fluid under pressure in such a way that the total forces exerted are dependent upon the relationship of the areas of the pistons. This may involve applying a small piston against a locked body of fluid to act against a large piston.

Still another object is a novel arrangement involving pistons through one of which pressure fluid is applied against another piston and then pressure fluid is applied against the said one piston and against fluid locked between the pistons to the said other piston.

A still further object is the provision of improved valve means and valve control means for use with a force-applying system involving the use of fluid under pressure. The valve means and valve control means may advantageously be employed in cooperation with the parts set forth in the preceding four paragraphs.

The single figure of the drawing is a sectional view through the novel fluid-pressure apparatus of the present invention. The reference character 10 designates a part such as a movable mold part, that is to be moved into assembled relation with another part and held with force in such assembled relation. Attached to the part 10 is a rod or stem 11 integral with a piston 12. The piston 12 fits closely slidably in a bore 13 of a housing structure 14. The piston 12 carries suitable narrow rings 15 of packing or sealing material at one end, held in place by a metal ring 16 secured to the piston by screws 17, of which only one is shown. At the other end of the piston 12 are wider rings 18 of packing or sealing material held in place by a metal ring 19, secured to the piston by screws 20, of which only one is shown. The left end of the housing 14 is closed by an end member 21 secured to the housing by screws 22. The end member 21 carries rings 23, which seal the stem 11. The sealing rings 23 are held between metallic rings 24 and 25. The ring 25 fits against a shoulder formed in the end member 21, and the ring 24 is engaged by a ring 26 secured to the end member 21 by screws 27. The housing structure 14 has a bore 28, formed in part by packing rings 29 secured in place by a ring 30 attached by screws 31 to the housing structure 14. The bore 28 is smaller than the bore 13, and the bore 28 with its sealing rings 29 receives a portion 32 of a piston 33, which portion is smaller in diameter than the piston 12. The piston 33 has a portion 34, which is considerably larger than the piston 12 and the portion 32 of the piston 33 and fits within a bore 35 of a casing member 36. The portion 34 of the piston 33 carries sealing rings 37, which seal the piston portion in the bore. The sealing rings 37 are secured to the piston portion 34 by a ring 38 attached to the piston portion by screws 39, of which only one is shown.

The right end of the piston 33 has a shallow recess 40 approximately equal in diameter to the portion 32 of the piston 33. A passage 41 extends from the recess 40 to the left end of the piston 33, or in other words, the face of the piston portion 32. The bore 41 carries a valve seat 42 set back slightly from the left end of the bore. A head 43 of a valve 44 rests against the valve seat 41, and a stem 45 of the valve extends through the passage and somewhat beyond the right end of the piston 33. Wings 46 on the valve stem 45 centralize the stem in the bore 41. A spring 47 acting between a shoulder near the right end of the bore 41 and a collar secured to the right end of the valve stem 45 urges the valve head 43 against the seat 42. A diagonal passage 48 extends between the recess 40 and an intermediate region of the bore 41. Radially outward of the recess 40 is a sealing ring 49 retained in a recess in the right end of the piston 33 by a ring 50 secured to the piston by screws 51, of which only one is shown. Radially outward of the rings 49 and 50 is a face portion 52 of the right end of the piston 33, which is slightly spaced from a face 53 of the casing member 36. The ring 49 seals the space between the faces 52 and 53 from the recess 40. The casing member 36 has a bore 53ª having an enlarged portion 54 opening to the recess 40. A conduit 55 is connected by a fitting 56 to the bore 53. The casing member 36 is secured to the housing structure 14 by screws 57. Coil springs 57ª resting in recesses 57ᵇ and 57ᶜ in the housing structure 14 and the piston 32 urge the piston 32 into the position shown, i. e., with the seal 49 contacting the face 53 of the casing member 36 so as to seal the space between the face 53 and the face portion 52 of the piston 32 from the recess 40. In the position shown the end of the valve stem 45 projects beyond the right end of the piston 32 into a bore 58 formed in the casing member into contact with a piston valve 59 slidably mounted in the bore 58. The valve 59 has a centrally located reduced portion 60 and a reduced axial extension 61 located in a bore 62 formed as an enlarged axial extension of the bore 58. The end of the extension 61 has a slot 63 and is adjacent a fitting 64 having threaded engagement with the casing member 36 at the end of the bore 62. A washer 65 rests on the extension 61 against the shoulder between the piston 59 and the extension 61 and a cup-shaped seal 66 rests against the washer 65 and fits tightly within the bore 62. A spring 67 acting between the fitting 64 and the cup seal 66 urges the seal 66 against the washer 65 and the washer against the shoulder between the piston 59 and the extension 61. A passage 68 extends from the outside of the casing member 36 across the bore 58 and has a wide portion 69 at one side of the bore 58. A passage 70 extends at right angles from the inner end of the passage 68, and a fitting 71 connected to a drain line is connected to the outer end of the passage 70. A by-pass 72 connects the bore 62 and the passage 68. The outer end of the passage 68 is closed by a plug 73. A short passage 74 joins the passage 68 and the space between the faces 52 and 53 of the piston 32 and the casing member 36.

The line 55 is connected to an outlet 74 of a four-way valve 75, which also has outlets 76, 77, and 78, to which are connected respectively, a pressure line 79, an exhaust line 80, and a pipe section 81 connected to a passage 82 in the housing structure 14. The passage 82 communicates with an annular space 83 between the rod 11 of the piston 12 and the inner wall 13 of the housing structure 14. A passage 84 extends through the housing structure 14 from the passage 82 for a short distance and has connected to it a fitting 85 to which is connected a conduit 86 connected in turn to a fitting 87 connected in the fitting 64. The valve 75 adjusted as shown provides communication between the exhaust line 80 and the annular space 83 and the line 71 leading to the valve 59 and between the pressure line 79 and the line 55 leading to the passage 53 and the recess 40 in the piston 32.

The drawing shows both pistons 12 and 32 as far to the right as possible. The part 10 is thus disassembled or spaced from the part with which it is to be finally associated. With the fluid pressure very low at the outset the piston valve 59 will be displaced to the left of the position shown under the action of the spring 67, in which position the groove 60 in the piston valve connects the passages 68 and 70. Displacement of the piston valve to the left of the position shown causes displacement of the valve 44 against the spring 47 to the left to open position. Fluid under pressure flows from the line 79 through the valve 75, the line 55, the fitting 56, the passage 53, the recess 40 into the passages 41 and 48. As a result the piston 12 moves to the left bringing the part 10 to its desired assembled relation. Further movement is either impossible or possible only with greatly increased force. The pressure of the fluid increases to a value that causes the piston valve 59 to move to the right against the spring 67. This permits the spring 47 to close the valve 44. Both valves are now in the position shown. The passage 68 is now disconnected from the drain passage 70. Now fluid under pressure flows from the recess 40 through the bore 58, the widened portion 69, the passages 68 and 74 into the space between the faces 52 and 53 of the large end 34 of the piston 33 and the casing member 36. Up to this point direct flow of fluid from the recess 40 to the aforementioned space has been impossible because of the sealing effected by the ring 49. But now the pressure fluid, acting both against the area of the recess 40 in the piston 33 and against the area of the face 52 of the piston 33, causes the piston 33 to be moved to the left against the relatively strong springs 58, which are otherwise capable of resisting the force of the pressure fluid against only the recess 40. Since the sealing ring 49 moves out of sealing relation with the face 53 of the casing member there is direct access for the pressure fluid from the recess 40 to the face 52. The total force exerted by the pressure fluid is increased somewhat more than an amount equal to the area of the face 52 times the pressure. The total force is now equal to the pressure times the area of the large end 34 of the piston 33. This same force is exerted by the small end 32 of the piston 33 against the body of fluid locked between the pistons 12 and 33. The force exerted against the piston 12 is greater than the force exerted by the piston 33 by an amount equal to the pressure exerted on the locked body of fluid times the difference between the area of the piston 12 and the small end 32 of the piston 33. Thus the very much greater force exerted upon the piston 12 and exerted by it in turn upon the part 10 is effective to move the part 10 against greatly increased resistance or to maintain the part very firmly in a certain position. For example, the certain position may be one of assembled relation of stationary and movable mold parts, the part 10 being the movable mold part.

When it is desired to move the part 10 out of this certain position, the valve 75 is adjusted so that the conduit 55 communicates with the exhaust line 80, and the pipe section 81, with the pressure line 79. Thus fluid under pressure is forced into the annular space 83 against the shoulder between the piston 10 and its integral rod extension 11 to move the piston 12 back to the right to the position shown. Fluid under pressure also flows through the line 86 and against the cup 66 so as to act in cooperation with the spring 67 to move the piston valve to the left until the washer 65 contacts the shoulder between the bores 58 and 62. In this position the reduced portion 60 is in the passage 68, and fluid may flow from between the faces 52 and 53 through the passages 74, 68, and 70 to the drain line 71. Movement of the piston valve 59 to the left causes the valve 43 to open so that the fluid locked between the piston 12 and the small end 32 of the piston 33 may escape. Connection of the conduit 55 to the drain line 80 releases the pressure exerted against the large end 34 of the piston 33 and permits escape of the fluid. The parts thus return to the position shown in the drawing.

At the lower side of the casing member 36 there is a drain passage 88 extending downwardly from the space betwen the faces 52 and 53 and closed by a plug 89. The plug is removed and fluid is drained through the passage if so much fluid accumulates in the space between the faces 52 and 53 as would tend to prevent return of the piston 53 to the position shown in the drawing. A horizontal drain passage 90 is provided in the housing structure 14 for draining the space between the left side of the large end 34 of the piston 33 and the housing structure 14. The passage 90 is closed by a drain plug 91.

A plurality of members 92, of which only one is shown, have threaded engagement with the casing member 36 and fit deep recesses in the large end 34 of the piston 33 so as to guide this piston and to prevent angular movement thereof with respect to the casing member 14.

I claim:

1. A device for shifting a part to a certain position and for holding with force the part in the said certain position, said device comprising a first piston connected with the part and having a pressure-receiving area, a second piston having at one end a first pressure-receiving area opposed to and smaller than the pressure-receiving area of the first piston, at the other end a second pressure-receiving area larger than the first pressure-receiving area, and a through passage extending between the first and second areas, means slidably mounting the pistons and forming with the area of the first piston and the first area of the second piston a first enclosed space for fluid under pressure, means slidably mounting the second piston and forming with the second pressure receiving area thereof a second enclosed space for fluid under pressure having in one position of the second piston a cross-sectional area equal to that of the second area and in another position of the second piston a cross-sectional area substantially less than the second area, means for supplying fluid under pressure through the passage in the second piston into the first enclosed space against the area of the first piston for shifting the first piston to move the part to the said certain position, means for thereafter closing the through passage in the second piston to lock fluid between the pistons in the first enclosed space, and means for thereafter applying fluid under pressure to the second enclosed space against the second area of the second piston for shifting the second piston to apply pressure through compression of the fluid locked between the pistons against the first piston maintained in its certain position.

2. A device for shifting a part to a certain position and for holding with force the part in the said certain position, said device comprising a first piston connected with the part and having a pressure-receiving area, a second piston having a first portion provided with a pressure-receiving area smaller than and opposed to the pressure-receiving area of the first piston, means slidably mounting the first piston and forming an enclosed space between the pressure-receiving areas of the pistons, means slidably mounting the second piston and enclosing a space between itself and a second portion of the second piston, the second piston having a through passage extending between the aforementioned portions thereof, means for supplying fluid under pressure to the space between the second piston and the means enclosing the same against only a relatively small area of the second portion of the second piston, through the passage in the second piston, and into the space between the pistons for shifting the first piston to move the part to its certain position, means for thereafter closing the passage in the second piston to lock fluid between the pistons, and means for thereafter supplying fluid under pressure to the space between the second piston and the means enclosing the same against a relatively large area of the second portion of the second piston for shifting the second piston and applying pressure through compression of the fluid between the pistons against the second piston to maintain the part in its certain position.

3. A device for shifting a part to a certain position and for holding with force the part in the said certain position, said device comprising a first piston connected with the part and having a pressure-receiving area, a second piston having a first portion provided with a pressure-reeciving area smaller than and opposed to the pressure-receiving area of the first piston, means slidably mounting the first piston and forming an enclosed space between the pressure-receiving areas of the pistons, means slidably mounting the second piston and enclosing a space between itself and a second portion of the second piston, the second piston having a through passage extending between the aforementioned portions thereof, the second piston and the means enclosing the same being so formed as to cause only a relatively small area of the second portion of the second piston to be accessible to fluid under pressure in a certain position of the second piston and a relatively large area of the second portion of the second piston to be accessible to fluid under pressure upon shifting of the second piston away from its said certain position, means for supplying fluid under pressure to the space between the second piston and the means enclosing the same against only the relatively small area of the second portion of the second piston, through the passage in the second piston, and into the space between the pistons for shifting the first piston to move the part to its certain position, means for thereafter closing the passage in the second piston lock fluid between the pistons, and means for thereafter supplying fluid under pressure to the space between the second piston and the means enclosing the same to make the fluid act against the relatively large area of the second portion of the second piston and shift the same for applying pressure through compression of the fluid between the pistons against the first piston to maintain the part in its certain position.

4. In combination, a first piston, means slidably mounting the first piston, a second piston having one end facing the first piston and a through passage extending from the said one end to the other end, a first valve controlling the through passage, means slidably mounting the second piston, means enclosing a space between the first piston and the said one end of the second piston, enclosure means cooperating with the said other end of the second piston for causing only a small area of the said other end of the second piston to be exposed in one position of the second piston and a large area of the said other end of the second piston to be exposed in another position of the second piston, means for supplying pressure fluid to the small area of the second piston and through the passage in the second piston to the first piston to shift the first piston, and a second valve associated with the enclosure means so as to have a closed position with respect thereto up to a certain fluid pressure, in which closed position the pressure fluid is restricted to the small area of the second piston and the second valve holds open the first valve, and to have an open position with respect to the enclosure means above the said certain fluid pressure, in which open position the first valve is permitted to close the through passage in the second piston for locking fluid between the pistons and pressure fluid reaches the large area of the second piston in order to move the second piston into the position in which the large area thereof is exposed by the enclosure means.

5. The combination specified in claim 4 and further including means for applying fluid under pressure against the first piston to shift it back toward the first piston and for applying fluid under pressure to move the second valve to closed position and thereby to bring the first valve to open position for permitting escape of fluid from between the pistons.

6. In combination, a first piston having a pressure-receiving area, a second piston having at one end a first pressure-receiving area opposed to and smaller than the pressure-receiving area of the first piston, at the other end a second pressure-receiving area larger than the first pressure-receiving area, and a through passage extending between the first and second areas, means slidably mounting the pistons and forming with the area of the first piston and the first area of the second piston a first enclosed space for fluid under pressure, means slidably mounting the second piston and forming with the second pressure receiving area thereof a second enclosed space for fluid under pressure having in one position of the second piston an area equal to that of the second area and in another position of the second piston an area substantially less than the second area, means for supplying fluid under pressure through the passage in the second piston into the first enclosed space against the area of the first piston for shifting the first piston, means for thereafter closing the through passage in the second piston to lock fluid between the pistons in the first enclosed space, and means for thereafter applying fluid under pressure to the second enclosed space against the second area of the second piston for shifting the second piston to apply pressure against the first piston through compression of the fluid locked between the pistons.

7. In combination, a first piston having a pressure-receiving area, a second piston having a first portion provided with a pressure-receiving area smaller than and opposed to the pressure-receiving area of the first piston, means slidably mounting the first piston and forming an enclosed space between the pressure-receiving areas of the pistons, means slidably mounting the second piston and enclosing a space between itself and a second portion of the second piston, the second piston having a through passage extending between the aforementioned portions thereof, means for supplying fluid under pressure to the space between the second piston and the means enclosing the same against only a relatively small area of the second portion of the second piston, through the passage in the second piston, and into the space between the pistons for shifting the first piston, means for thereafter closing the passage in the second piston to lock fluid between the pistons, and means for thereafter supplying fluid under pressure to the space between the second piston and the means enclosing the same against a relatively large area of the second portion of the second piston for shifting the second piston and applying pressure against the second piston through compression of the fluid between the pistons.

8. In combination, a first piston having a pressure-receiving area, a second piston having a first portion provided with a pressure-receiving area smaller than and opposite the pressure-receiving area of the first piston, means slidably mounting the first piston and forming an enclosed space between the pressure-receiving areas of the pistons, means slidably mounting the second piston and enclosing a space betwen itself and a second portion of the second piston, the second piston having a through passage extending between the aforementioned portions thereof, the second piston and the means enclosing the same being so formed as to cause only a relatively small area of the second portion of the second piston to be accessible to fluid under pressure in a certain position of the second piston and a relatively large area of the second portion of the second piston to be accessible to fluid under pressure upon shifting of the second piston away from its said certain position, means for supplying fluid under pressure to the space between the second piston and the means enclosing the same against only the relatively small area of the second portion of the second piston, through the passage in the second piston, and into the space between the pistons for shifting the first piston, means for thereafter closing the passage in the second piston to lock fluid between the pistons, and means for thereafter supplying fluid under pressure to the space between the second piston and the means enclosing the same to make the fluid act against the relatively large area of the second portion of the second piston and shift the same for applying pressure against the first piston through compression of the fluid between the pistons.

9. A device for shifting a part to a certain position and for holding with force the part in the said certain position, said device comprising a first piston connected with the part and having a pressure-receiving area, a second piston having one end provided with a first pressure-receiving area smaller than and opposed to the pressure-receiving area of the first piston, means slidably mounting the first piston and forming an enclosed space between the area of the first piston and the first area of the second piston, means slidably mounting the second piston and enclosing a space between itself and a second pressure-receiving area at the opposite end of the second piston, the second piston having a through passage extending between the aforementioned ends thereof, means for supplying fluid under pressure through the passage in the second piston and into the space between the pistons for shifting the first piston to move the part to its certain position, means for thereafter closing the passage in the second piston to lock fluid in the space betwen the pistons, and means for thereafter supplying fluid under pressure against the second pressure-receiving area of the second piston for shifting the second piston and applying pressure through compression of the fluid between the pistons against the second piston to maintain the part in its certain position.

10. In combination, a first piston having a pressure-receiving area, a second piston having one end provided with a first pressure-receiving area smaller than and opposed to the pressure-receiving area of the first piston, means slidably mounting the first piston and forming an enclosed space between the area of the first piston and the first area of the second piston, means slidably mounting the second piston and enclosing a space between itself and a second pressure-receiving area at the opposite end of the second piston, the second piston having a through passage extending between the aforementioned ends thereof, means for supplying fluid under pressure through the passage in the second piston and into the space betwen the pistons for shifting the first piston, means for thereafter closing the passage in the second piston to lock fluid in the space between the pistons, and means for thereafter supplying fluid under pressure against the second pressure-receiving area of the second piston for shifting the second piston and applying pressure against the second piston through compression of the fluid between the pistons.

WALTER P. COUSINO.

REFERENCES CITED

The following references are of record in the file of this patent:

UNITED STATES PATENTS

| Number | Name | Date |
| --- | --- | --- |
| 1,970,999 | Ferris | Aug. 21, 1934 |
| 2,191,882 | Ernst et al. | Feb. 27, 1940 |
| 2,272,360 | Swift | Feb. 10, 1942 |
| 2,300,136 | Rockwell | Oct. 27, 1942 |
| 2,351,872 | Parker | June 20, 1944 |
| 2,357,632 | Cornelius | Sept. 5, 1944 |
| 2,381,930 | Schnell | Aug. 14, 1945 |

Certificate of Correction

Patent No. 2,452,292.  October 26, 1948

WALTER P. COUSINO

It is hereby certified that error appears in the printed specification of the above numbered patent requiring correction as follows:

Column 6, line 72, claim 3, after the word "piston" insert *to*; and that the said Letters Patent should be read with this correction therein that the same may conform to the record of the case in the Patent Office.

Signed and sealed this 22nd day of February, A. D. 1949.

[SEAL]

THOMAS F. MURPHY,
*Assistant Commissioner of Patents.*